United States Patent [19]

Hattori et al.

[11] Patent Number: 5,671,638
[45] Date of Patent: Sep. 30, 1997

[54] LOCK SYSTEM FOR MOTOR VEHICLE

[75] Inventors: Masaichi Hattori; Osamu Shoji, both of Aichi, Japan

[73] Assignee: Kabushiki Kaisha Tokai Rika Denki Seisakusho, Aichi, Japan

[21] Appl. No.: 598,970

[22] Filed: Feb. 9, 1996

[30] Foreign Application Priority Data

Feb. 13, 1995 [JP] Japan ................................. 7-024165

[51] Int. Cl.⁶ ............................. F16H 63/36; B60K 41/28
[52] U.S. Cl. ........................ 74/483 R; 192/4 A; 477/96
[58] Field of Search ..................... 74/483 R; 192/4 A; 477/96

[56] References Cited

U.S. PATENT DOCUMENTS

| 5,127,245 | 7/1992 | Imai et al. | 477/96 X |
| 5,181,592 | 1/1993 | Pattock | 477/96 X |
| 5,257,551 | 11/1993 | Iwata | 477/96 X |
| 5,402,870 | 4/1995 | Osborn | 74/483 R X |

*Primary Examiner*—Allan D. Herrmann
*Attorney, Agent, or Firm*—Morgan, Lewis and Bockius, LLP

[57] ABSTRACT

A lock plate moves in a direction indicated by an arrow by the operation of a detent knob. A stopper plate to which a main body of an electromagnetic solenoid is fixed is designed to reciprocate between a lock position and an unlock position, the lock position being a position at which a stopper section confronts the lock plate and the unlock position being a position at which the stopper section evacuates from the lock plate. The stopper plate is normally urged toward the lock position by return springs. A cam member coupled to a plunger of the electromagnetic solenoid receives a force to move to the unlock position through the operation of the cam with respect to the lock plate. A resiliency of the return springs is set to a value smaller than a resultant force of a plunger attracting force of the electromagnetic solenoid and a resiliency of a trip spring that urges the plunger in a plunger attracting direction.

6 Claims, 8 Drawing Sheets

LOCK SYSTEM FOR MOTOR VEHICLE

BACKGROUND OF THE INVENTION

1. Field of the Invention

The invention relates to a lock system for motor vehicles adapted for use in automobile shift lock systems.

2. Related Art

A shift lock system arranged in an automobile is generally designed so that the automatic transmission does not change from the parking position to other positions unless the foot brake is pedaled when the automobile starts. FIGS. 16 and 17 show exemplary constructions of the main portions of such a shift lock system.

That is, in FIGS. 16 and 17, a lock plate 1 is designed to be moved in a direction indicated by an arrow A (hereinafter referred to as the "A direction") in FIG. 16 when a detent knob arranged on a not shown shift lever for changing shift positions is pressed. The lock plate 1 is normally urged and held in the position shown in FIG. 16. A stopper 3 supported through a shaft 2a of a fixed plate 2 allows one end thereof to be turned between a lock position (shown by the solid line in FIG. 17) and an unlock position (shown by the two dot chain line in FIG. 17). The lock position is a position at which the lock plate 1 is prohibited from moving in the A direction. The unlock position is a position at which the lock plate 1 is permitted to move.

The other end of the stopper 3 is turnably coupled to a plunger 4a of an electromagnetic solenoid 4. When the electromagnetic solenoid 4 is energized, the stopper 3 is moved to the unlock position. Further, the electromagnetic solenoid 4 has a return compression coil spring 5. When the electromagnetic solenoid 4 is disenergized, the stopper 3 is held in the lock position by the resiliency of the return compression coil spring 5. The electromagnetic solenoid 4 is normally disenergized and becomes energized only when the ignition circuit of the automobile is formed and the foot brake is pedaled with the automatic transmission set to the parking position.

Therefore, when the electromagnetic solenoid 4 is disenergized, the stopper 3 is held in the lock position by the resiliency of the return compression coil spring 5. As a result, the lock plate 1 is prohibited from moving in the A direction, so that the pressing of the detent knob is made ineffective. Further, when the electromagnetic solenoid 4 is energized, the stopper 3 is turned to the unlock position by the electromagnetic solenoid 4, so that the lock plate 1 is permitted to move in the A direction to thereby make the pressing of the detent knob effective.

In order to move the stopper 3 to the unlock position from the lock position in the conventional construction, the electromagnetic solenoid 4 must attract the stopper 3 running against the resiliency of the return compression coil spring 5 because of the presence of the return compression coil spring 5. Therefore, power consumption of the electromagnetic solenoid 4 becomes relatively large, which in turn makes it inevitable to increase the size of the electromagnetic solenoid 4. This imposes a restriction in the space for allowing the electromagnetic solenoid 4 to be incorporated into the shift lever. In addition, the operating noise accompanied by the movement of the plunger 4a at the time of energizing the electromagnetic solenoid 4 leads to a problem of increased noise.

SUMMARY OF THE INVENTION

The invention has been made in view of the aforementioned circumstances. The object of the invention is therefore to provide a lock system for motor vehicles which can reduce power to be consumed by an electromagnet arranged to make the operation of an operating member selectively ineffective, which can implement the downsizing of the electromagnet and hence the entire part of the system, which can suppress noise, and further which can ensure that the function of making the operation of the operating member selectively ineffective will be performed even if the operating member is operated violently.

To achieve the above object, the invention is applied to a lock system for motor vehicles that selectively makes an operation of an operating member ineffective. The lock system for motor vehicles includes: an interlock member for moving in a predetermined moving direction while interlocking with the operation of the operating member; a stopper member capable of reciprocating between a lock position and an unlock position, the lock position being a position at which movement of the interlock member is prohibited by bringing the interlock member into contact with the stopper member when the interlock member is moved in the operating direction, the unlock position being a position at which the interlock member is permitted to move by evacuating the stopper member from a locus of movement of the interlock member; an idle member for giving a moving force allowing the stopper member to move toward the unlock position in response to the movement of the interlock member in the operating direction; a movable member to which the moving force of the idle member is transmitted; an electromagnet having a main body fixed to the stopper member and binding the movement of the movable member with respect to the main body while being energized; a first spring means for urging the idle member toward the lock position of the stopper member together with the movable member; and a second spring means for urging the stopper member toward the lock position together with the main body of the electromagnet. In such lock system for motor vehicles, a resiliency of the second spring means is set to a value larger than a resiliency of the first spring means and smaller than a resultant force of a movable member attracting force of the electromagnet and a resiliency of the first spring means.

In this case, the idle member may be constructed of a cam member being moved toward the unlock position of the stopper member by means of cam action resulting from the idle member coming in contact with the interlock member when the interlock member is moved in the operating direction.

Moreover, the electromagnet may be constructed of an exciting coil and yokes of an electromagnetic solenoid, and the movable member may be constructed of a plunger of the electromagnetic solenoid.

In the lock system for motor vehicles of the present invention, the stopper member is urged toward the lock position by the second spring means together with the main body of the electromagnet. Therefore, the stopper member is normally set in the lock position. Further, the idle member is urged toward the lock position of the stopper member by the first spring means together with the movable member.

When the operating member is operated, the interlock member is moved in the operating direction in response thereto, and as a result of such movement of the interlock member, a moving force toward the unlock position of the stopper member is given to the idle member, so that the moving force is transmitted to the movable member. At this instance, if the electromagnet is energized at the time of operating the operating member, the movement of the movable member with respect to the main body of the electromagnet is bound. In this case, the resiliency of the second spring means urging the main body toward the lock position is smaller than the resultant force of the movable member attracting force of the electromagnet and the resiliency of the first spring means urging the movable member toward the lock position. Therefore, when the moving force is transmitted to the movable member, the electromagnet, the movable member, and the stopper member fixed to the electromagnet are caused to move to the unlock position running against the resiliency of the second spring means.

As a result, when the interlock member is moved in the operating direction resulting from the operating of the operating member, the stopper member is kept evacuated from a locus of movement of the interlock member to thereby allow the interlock member to move in the operating direction. Therefore, the operation of the operating member is made effective.

On the other hand, when the electromagnet is deenergized at the time the operating member is operated, the movable member is kept movable with respect to the main body of the electromagnet. In this case, the resiliency of the first spring means urging the movable member toward the lock position is smaller than the resiliency of the second spring means. Therefore, when the moving force resulting from the operating of the operating member is transmitted to the movable member via the idle member, it is only the idle member and the movable member that are moved to the unlock position running against the resiliency of the first spring means, leaving the stopper member having the main body fixed thereto held in the lock position. As a result, when the interlock member is moved in the operating direction in response to the operating of the operating member, the interlock member is brought into contact with the stopper member to block the movement of the interlock member, so that the operation of the operating member is made ineffective.

Therefore, the electromagnet is required to merely keep the movable member unmovable with respect to the main body, which in turn contributes to implementing the downsizing of the electromagnet and hence of the entire part of the system. In addition, when the electromagnet is energized, the movable member does not move, and this prevents noise to be accompanied by the movement of the movable member. As a result, noise can be suppressed.

Further, the stopper member is normally in the lock position, and the resiliency of the second spring means urging the stopper member toward the lock position is larger than the resiliency of the first spring means urging the idle member toward the lock position together with the movable member. Therefore, even if the operation of moving the interlock member via the operating member is performed violently, only the movable member and the idle member are moved to the unlock position with the stopper member being left held in the lock position. As a result, the interlock member can be reliably blocked by the stopper member, which in turn ensures that the function of making the operation of the operating member selectively ineffective will be performed even if the operating member is operated violently.

In the lock system for motor vehicles of the present invention, when the operating member is operated, the idle member serving as a cam member is given a moving force for moving to the unlock position of the stopper member by means of cam action resulting from the interlock member coming in contact with the idle member, the interlock member being moved in the operating direction by the operation of the operating member. Therefore, the moving force can be transmitted reliably.

In the lock system for motor vehicles of the present invention, the electromagnet and the movable member are combined to form a single electromagnetic solenoid. Therefore, this construction contributes to downsizing the system as a whole compared with the case where the electromagnet and the movable member are arranged separately.

BRIEF DESCRIPTION OF THE DRAWINGS

FIG. 15 is a vertically sectional side view showing a second embodiment of the invention;

DETAILED DESCRIPTION OF THE PREFERRED EMBODIMENTS

A first embodiment of the invention applied to a shift lock system for automobiles will now be described with reference to FIGS. 1 to 11.

Figure 1A:
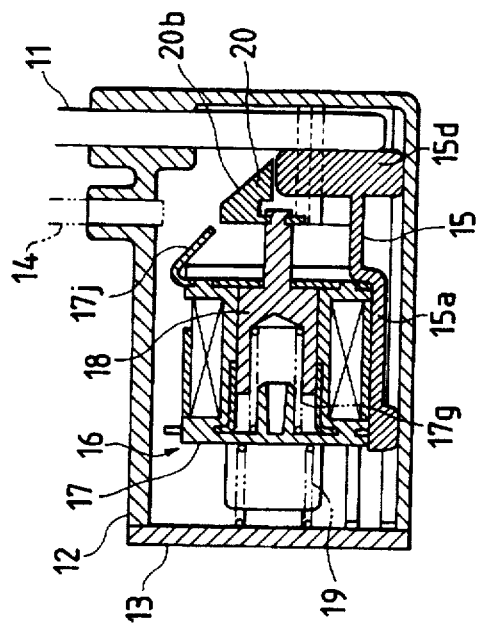
FIGS. 1(a) to (d) are vertically sectional views showing a first embodiment of the invention in different conditions.
Figure 1B:
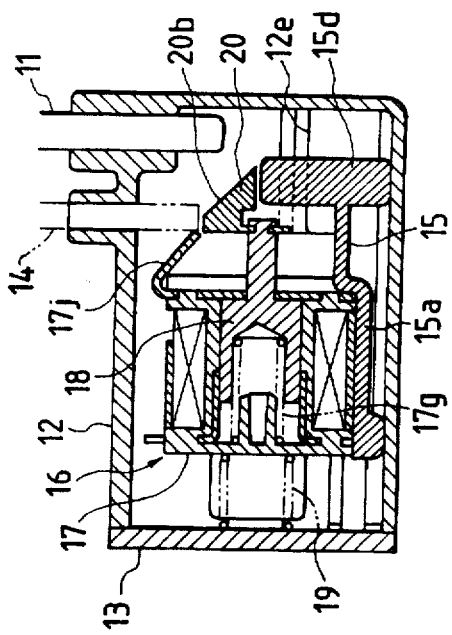
Figure 1C:
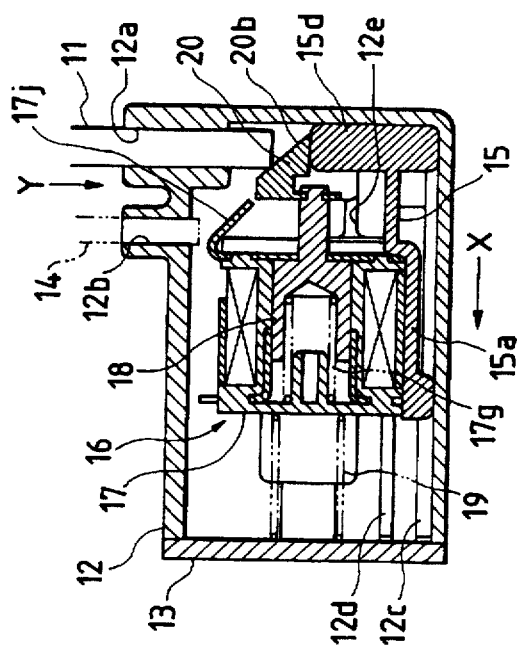
Figure 1D:
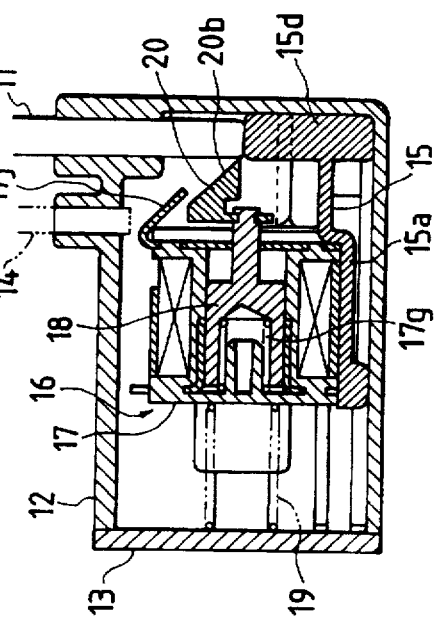
Figure 2:
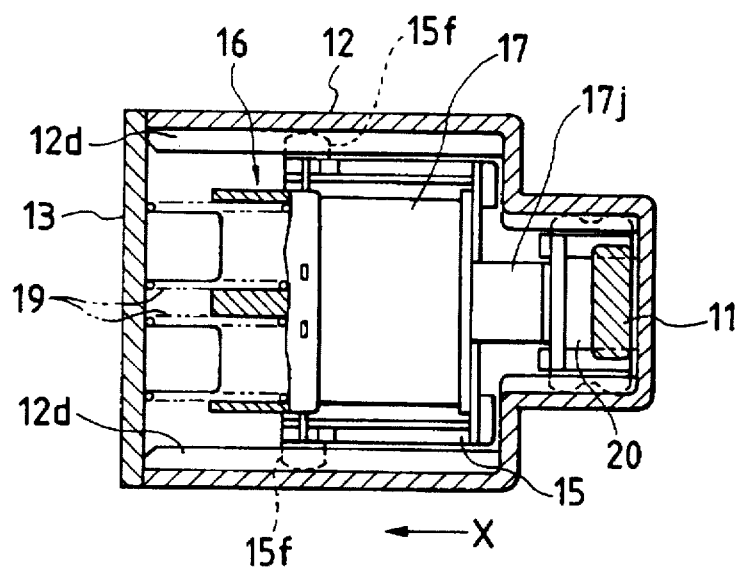
FIG. 2 is a horizontally sectional plan view.
Figure 3:
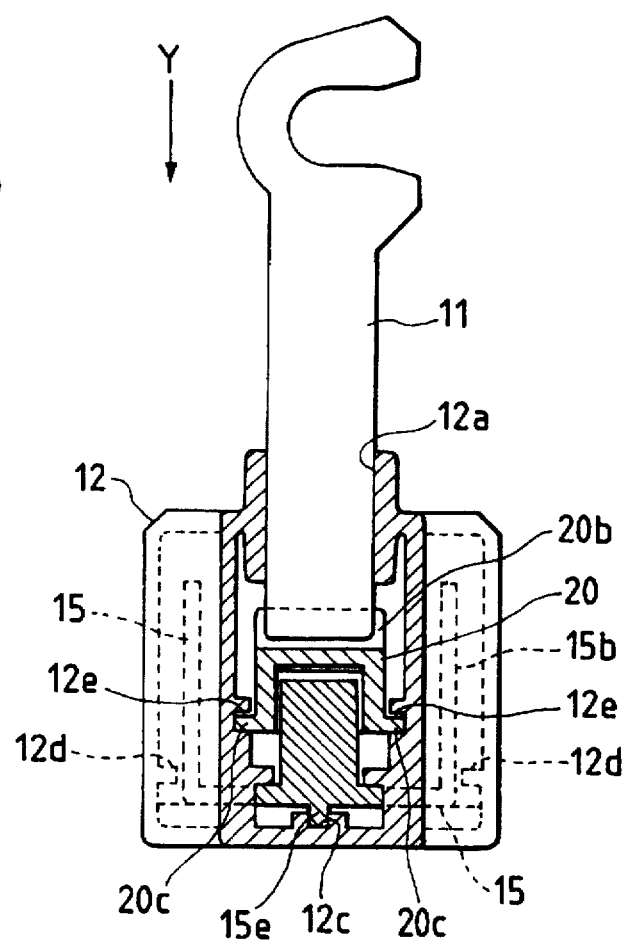
FIG. 3 is a vertically sectional front view.
Figure 4:
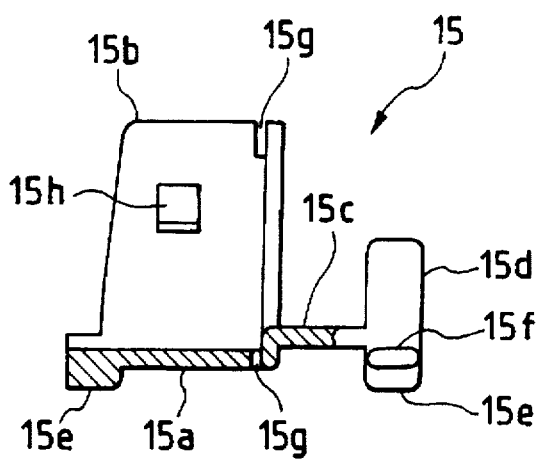
FIG. 4 is a partially cutaway side sectional view showing a stopper plate.
Figure 5:
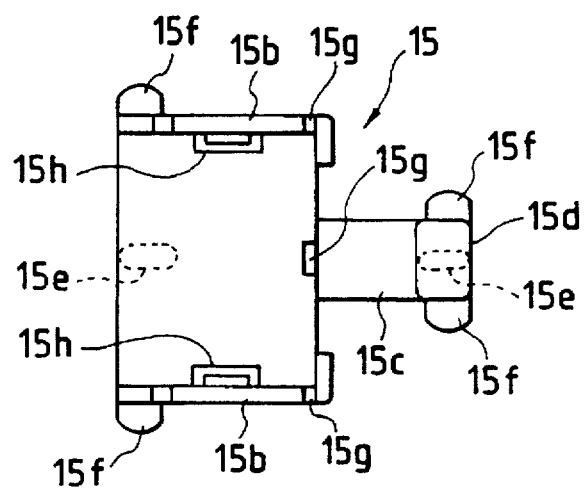
FIG. 5 is a plan view of the stopper plate.
Figure 6:
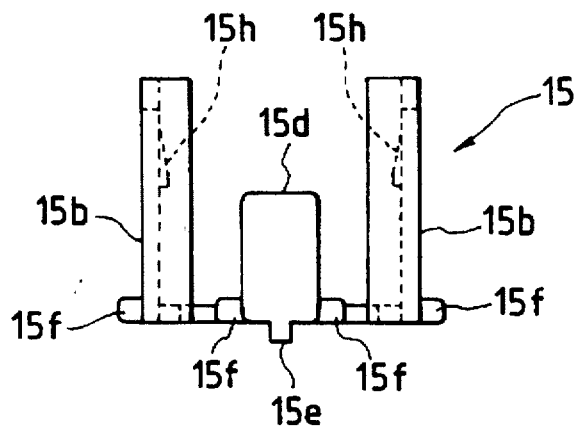
FIG. 6 is a front view of the stopper plate.
Figure 7:
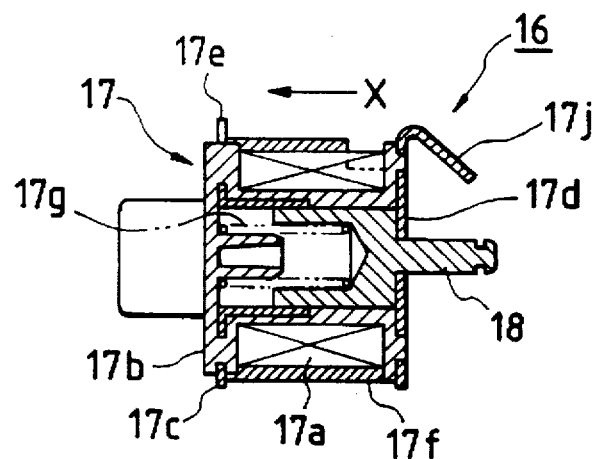
FIG. 7 is a vertically sectional side view of an electromagnetic solenoid.

In FIGS. 1 to 3, a lock plate 11 serving as an interlock member is arranged so as to be movable along the length thereof (in vertical directions as viewed in FIGS. 1 and 3). The lock plate 11 is also designed to reciprocate in a direction indicated by an arrow Y (hereinafter referred to as the "Y direction") and in the direction opposite to the Y direction in FIGS. 1 and 3 by the pressing and unpressing of a detent knob of a known construction. The detent knob belongs to an automatic transmission (not shown) shift lever.

A case 12 having an opening on a side thereof is fixed at an appropriate stationary position. The side opening of the case 12 is designed to be closed by a cover 13. A guide hole 12a that allows the lock plate 11 to be inserted thereinto and a through hole 12b that allows a cancel pin 14 (to be described later) to be inserted thereinto are arranged in the upper surface of the case 12.

A stopper plate 15 corresponding to a stopper member of the invention is arranged on the bottom of the case 12 so as to reciprocate in directions orthogonal to the moving directions of the lock plate 11 (in a direction indicated by an arrow X (hereinafter referred to as the "X direction") and in the direction opposite to the X direction in FIGS. 1 and 2). A specific shape of the stopper plate 15 will hereunder be described with reference also to FIGS. 4 to 6.

That is, the stopper plate 15 basically has a rectangular plate section 15a, a pair of wall sections 15b, 15b, and a rectangular prism stopper section 15d integrally. The pair of wall sections 15b, 15b rise from both sides of the rectangular plate section 15a (both sides as viewed in a direction orthogonal to the direction indicated by the arrow X). The rectangular prism stopper section 15d rises at the end of an arm section 15c that extends from an end of the plate section 15a (the end of the plate section 15a being as viewed in the direction opposite to the direction indicated by the arrow X). The stopper plate 15 is designed to reciprocate between a lock position and an unlock position. The lock position is a position at which the stopper section 15d confronts the end of the lock plate 11 from below (the position shown in FIGS. 1(a), (c) and FIG. 2). The unlock position is a position at which the stopper section 15d is evacuated from a locus of movement of the end of the lock plate 11 (the position shown in FIGS. 1(b), (d)).

It may be noted that legs 15e, 15e are projected so as to extend linearly in the middle of both the lower end portion of the plate section 15a and the lower surface of the stopper section 15d in the stopper plate 15. These legs 15e are inserted into a guide groove 12c so as to be slidably movable. The guide groove 12c is formed so as to extend in the X direction and in the direction opposite to the X direction in the middle of the bottom surface of the case 12 (see FIGS. 1 and 3). Further, a total of 4 guide projections 15f are arranged on both sides of the plate section 15a and on both sides of the stopper section 15d in the stopper plate 15. These projections 15f are arranged so as to come in slidable contact with a pair of guide ribs 12d (see FIGS. 1 to 3) from below. The pair of guide ribs 12d are formed in the confronting sides of the case 12 so as to extend in the X direction and in the direction opposite to the X direction.

Further, a total of 3 slits 15g are arranged so as to extend linearly along a portion at which the upper ends of the wall sections 15b, 15b of the stopper plate 15 are connected to the arm section 15c of the plate section 15a. These slits are used for fixing an electromagnetic solenoid 16 (to be described later). A pair of protuberances 15h similarly used for fixing the electromagnetic solenoid 16 are formed on the confronting surfaces of the wall sections 15b, 15b.

The electromagnetic solenoid 16 includes a main body 17 fixed to the stopper plate 15 and a plunger 18 movably supported by the main body 17. The specific construction of the electromagnetic solenoid 16 will hereunder be described with reference also to FIGS. 7 to 10. It may be noted that reference numerals 15, 16 respectively denoting the stopper plate and the electromagnetic solenoid are given only to the main portions in FIGS. 1 to 3 in order to avoid complication.

That is, the main body 17 of the electromagnetic solenoid 16 includes: an exciting coil 17a, a plastic bobbin 17b for supporting the exciting coil 17a; yokes 17c, 17d fixed to the bobbin 17b; a pair of coil terminals 17e, 17e arranged so as to pass through the bobbin 17b; a case 17f serving also as a yoke and being arranged so as to enclose the bobbin 17b; and a trip spring 17g constructed of a compression coil spring interposed between the bobbin 17b and the plunger 18. The trip spring 17g produces resiliency that urges the plunger 18 toward the yoke 17d (in the direction opposite to the X direction). It may be noted that the plunger 18 has the end thereof projected in the direction opposite to the X direction while passing through the yoke 17d. Further, the exciting coil 17a and the yokes 17c, 17d constitute the electromagnet of the invention.

In the thus constructed electromagnetic solenoid 16 the plunger 18 is normally brought into contact with the yoke 17d by the resiliency of the trip spring 17g. Further, when energized, the exciting coil 17a keeps the plunger 18 attracted to the yoke 17d; i.e., the movement of the plunger 18 with respect to the main body 17 is kept bound. It may be noted that the electromagnetic solenoid 16 is designed to be energized only when the ignition circuit of an automobile is formed and the foot brake is operated under the condition that the automatic transmission is set in the parking position.

Figure 8:
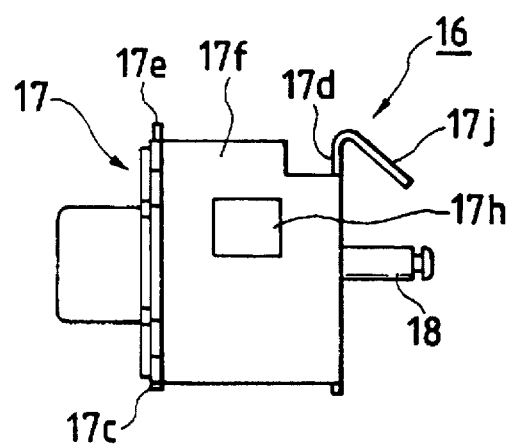
FIG. 8 is a side view of the electromagnetic solenoid.
Figure 9:
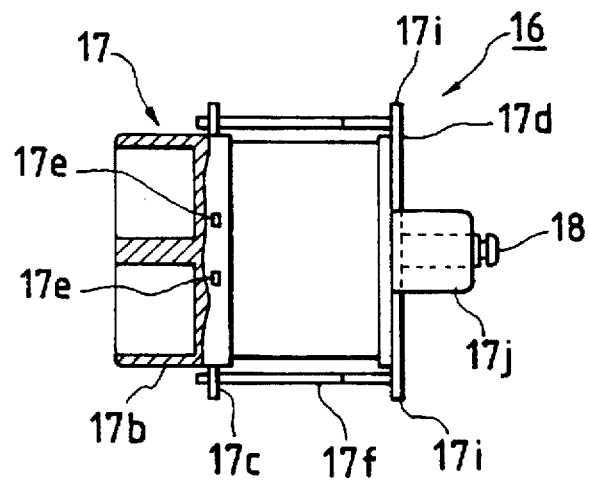
FIG. 9 is a partially cutaway plan view of the electromagnetic solenoid.
Figure 10:
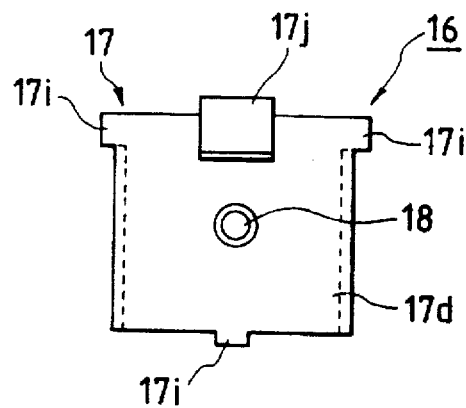
FIG. 10 is a front view of the electromagnetic solenoid.

Further, a pair of windows 17h (only one of the pair is shown in FIG. 8) engageable with the pair of protuberances 15h arranged on both sides of the stopper plate 15 are formed on both sides of the case 17f of the electromagnetic solenoid 16. Further, not only a total of 3 protuberances 17i (see FIGS. 9 and 10) respectively engageable with the 3 slits 15g formed in the stopper plate 15 are formed on the yoke 17d of the electromagnetic solenoid 16, but also a cam 17j that is downwardly sloped in the direction opposite to the X direction is formed so as to bend in the middle of the upper portion of the yoke 17d.

Thus, when the electromagnetic solenoid 16 is fixed to the stopper plate 15, the main body 17 of the electromagnetic solenoid 16 is placed on the plate section 15a of the stopper plate 15 to thereby allow the main body 17 to be interposed between the wall sections 15b, 15b of the stopper plate 15. At this instance, by engaging the windows 17h on the side of the main body 17 with the protuberances 15h on the side of the stopper plate 15, the electromagnetic solenoid 16 is locked so as not to be released upward, and by fitting the protuberances 17i on the side of the main body 17 into the slits 15g on the side of the stopper plate 15, the electromagnetic solenoid 16 is positioned in both the X direction and the direction opposite to the X direction. It may be noted that play produced between the protuberances 17i and the slits 15g is absorbed by bending the protuberances 17i, if necessary, so as to suppress the playing of the electromagnetic solenoid 16 in the fixed position.

Further, the cam plate 17j is designed to be positioned so as to confront the tip of the cancel pin 14 from below when the stopper plate 15 is in the lock position (see FIGS. 1(a) and (c)).

Returning to FIGS. 1 to 3, two return springs 19, each being constructed of a compression coil spring, are interposed side by side between the cover 13 and the main body 17 of the electromagnetic solenoid 16 so that expanding resiliency can be applied therebetween. As a result, the stopper plate 15 is normally urged toward the lock position (in the direction opposite to the X direction).

In this case, the total resiliency of the two return springs 19 is set to a larger value than the resiliency of the trip spring 17g. Further, the total resiliency of the return springs 19 is set to a smaller value than the resultant force of the plunger 18 attracting force of the electromagnetic solenoid 16 and the resiliency of the trip spring 17g.

Figure 11:
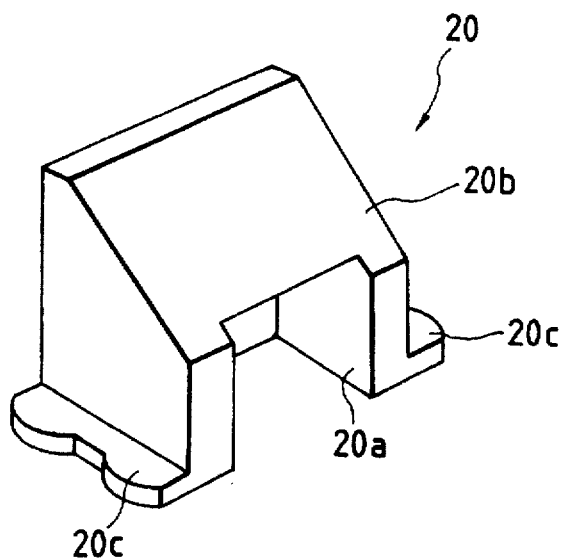
FIG. 11 is a perspective view of a cam member.

A cam member 20 is coupled to the end (the end portion projecting from the main body 17) of the plunger 18 of the electromagnetic solenoid 16. As shown in FIG. 11 in enlarged form, the cam member 20 is formed into a substantially square C-shaped body with a recess 20a that allows the stopper section 15d of the stopper plate 15 to be inserted thereinto. A cam surface 20b is formed on the upper surface of the cam member 20. The cam surface 20b is downwardly sloped in the direction opposite to the X direction.

In this case, the cam member 20 has the cam surface 20b thereof positioned so as to confront the end of the lock plate 11 with the stopper plate 15 being in the lock position and with the plunger 18 being in contact with the yoke 17d (see FIG. 1(a)). As a result, when the lock plate 11 is moved in the Y direction, the cam member 20 is given a moving force in the X direction by means of cam action resulting from the end of the lock plate 11 coming in contact with the cam surface 20b.

Further, a pair of guide projections 20c are arranged on both sides of the cam member 20. These projections 20c are inserted into a pair of guide grooves 12e (see FIGS. 1(a), (b) and FIG. 3) so as to be slidably movable. The pair of guide grooves 12e are formed in the confronting side surfaces of the case 12 so as to extend in both the X direction and the direction opposite to the X direction.

An operation of the aforementioned construction will be described next.

The stopper plate 15 is normally set in the lock position because the stopper plate 15 is urged toward the lock position (in the position shown in FIGS. 1(a), (c) and FIG. 2) by the resiliency of the return springs 19 together with the main body 17 of the electromagnetic solenoid 16. Further, the cam member 20 is urged toward the lock position of the stopper plate 15 by the resiliency of the trip spring 17g together with the plunger 18 of the electromagnetic solenoid 16. As a result, the cam member 20 has the cam surface 20b thereof positioned so as to confront the end of the lock plate 11 (the condition shown in FIG. 1(a)).

When the lock plate 11 is moved in the operating direction (in the Y direction) in response to the pressing of the detent knob (not shown) under this condition, the cam member 20 is given a moving force in the X direction by means of cam action resulting from the end of the lock plate 11 coming in contact with the cam surface 20b of the cam member 20. As a result, such moving force is transmitted to the plunger 18 coupled to the cam member 20.

When the electromagnetic solenoid 16 is energized at the time the detent knob is pressed, the plunger 18 is attracted to the yoke 17d of the main body 17 of the electromagnetic solenoid 16. As a result, the movement of the plunger 18 with respect to the main body 17 is bound. In this case, the resiliency of the return springs 19 urging the main body 17 is smaller than the resultant force of the plunger 18 attracting force of the electromagnetic solenoid 16 and the resiliency of the trip spring 17g urging the plunger 18 toward the lock position. Therefore, when the moving force is transmitted to the plunger 18 in response to the pressing of the detent knob as described above, both the entire part of the electromagnetic solenoid 16 and the stopper plate 15 fixed to the main body 17 of the electromagnetic solenoid 16 are moved to the unlock position running against the resiliency of the return springs 19 as shown in FIG. 1(b).

As a result, when the lock plate 11 is moved in the Y direction in response to the pressing of the detent knob, the stopper plate 15 is kept evacuated from the locus of movement of the lock plate 11 to thereby allow the lock plate 11 to move in the Y direction as shown in FIG. 1(b). Therefore, the pressing of the detent knob is made effective.

On the other hand, when the electromagnetic solenoid 16 is disenergized at the time the detent knob is pressed, the plunger 18 of the electromagnetic solenoid 16 becomes movable with respect to the main body 17. In this case, the resiliency of the trip spring 17g urging the plunger 18 toward the lock position is smaller than the resiliency of the return springs 19 urging the main body 17 toward the lock position. Therefore, when the moving force derived from the pressing of the detent knob is transmitted to the plunger 18 via the cam member 20 as described above, it is only the cam member 20 and the plunger 18 that are moved to the unlock position running against the resiliency of the trip spring 17g, with the stopper plate 15 to which the main body 17 fixed thereto being held in the lock position.

When the lock plate 11 is moved in the Y direction in response to the pressing of the detent knob, the end of the lock plate 11 comes in contact with the stopper section 15d of the stopper plate 15 as shown in FIG. 1(c), prohibiting the the stopper plate 15 as shown in FIG. 1(c), prohibiting the movement of the lock plate 11. Therefore, further pressing of the detent knob is made ineffective.

It may be noted that the detent knob can be pressed with the cancel pin 14 being pressed in order to make effective the pressing of the detent knob in the case where the electromagnetic solenoid 16 is not allowed to be energized for some reason. That is, with the cancel pin 14 being pressed, a moving force in the X direction is given to the electromagnetic solenoid 16 by means of cam action resulting from the tip of the cancel pin 14 coming in contact with the cam plate 17j of the electromagnetic solenoid 16. Therefore, as shown in FIG. 1(d), the stopper plate 15 is moved to the unlock position, which in turn makes the pressing of the detent knob effective.

According to the embodiment of the invention, it is required that the electromagnetic solenoid 16 only attract the plunger 18 so as to bind the movement of the plunger 18 with respect to the main body 17 while the electromagnetic solenoid 16 is being energized. This dispenses with attraction of the electromagnetic solenoid 16 running against the resiliency of a spring as in the conventional example, which in turn dispenses with large power. Therefore, the downsizing of the electromagnetic solenoid 16 and hence the downsizing of the entire part of the system can be implemented.

In this case, the stopper plate 15 is normally set in the lock position, and the stopper section 15d thereof is therefore always positioned below the lock plate 11. In addition, the resiliency of the return springs 19 urging the stopper plate 15 in the direction opposite to the X direction is larger than the resiliency of the trip spring 17g urging the plunger 18 in the direction opposite to the X direction. Therefore, even if the operation of moving the lock plate 11 is performed violently via the detent knob, it is only the plunger 18 and the cam member 20 that are moved in the X direction, with the stopper plate 15 being therefore held in the lock position. As a result, the movement of the lock plate 11 can be blocked by the stopper section 15d reliably, which in turn allows the detent knob operation prohibiting function (the function of selectively making the detent knob operation ineffective) to be performed reliably even if the detent knob is pressed violently.

In addition, the plunger 18 does not move at the time of energizing the electromagnetic solenoid 16. Therefore, no noise is made by the plunger 18, which in turn allows noise to be suppressed. Further, as a result of the design that the action of the cam member 20 is utilized to transmit the moving force between the lock plate 11 and the stopper plate 15, the moving force can be transmitted reliably.

Figure 12:
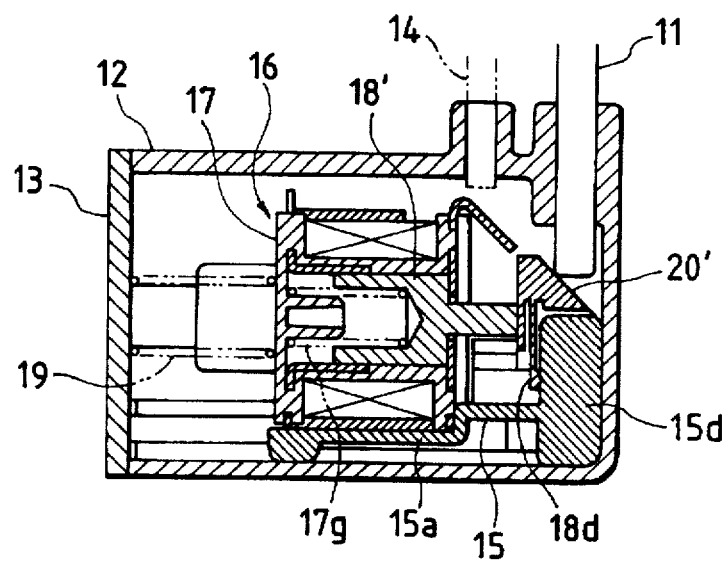
Figure 13:
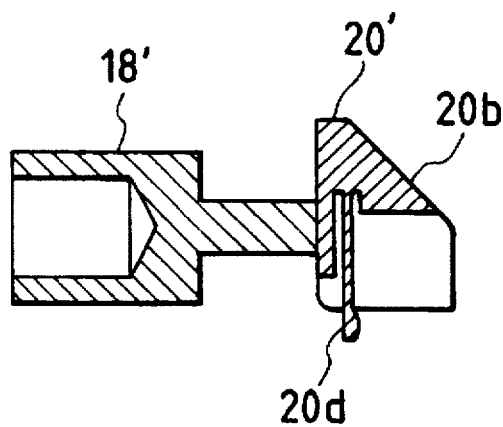
FIG. 13 is a vertically sectional side view showing a plunger and a cam member.

FIGS. 12 and 13 show main portions of a second embodiment of the invention that provides advantages similar to those of the first embodiment. Only parts of the second embodiment distinguished from those of the first embodiment will hereunder be described.

That is, while the plunger 18 of the electromagnetic solenoid 16 and the cam member 20 are coupled to each other in the first embodiment, a plunger 18' of the electromagnetic solenoid 16 is arranged so as to be in contact with a cam member 20' so that the moving force of a cam member 20' can be transmitted to the plunger 18' via the contact portion in the second embodiment. In this case, the cam member 20' is integrally molded out of resin, and the playing of the cam member 20' with respect to the plunger 18' is prevented by bringing a spring section 20d made of resin and projected integrally from the lower surface of the cam member 20' into pressure contact with the stopper section 15d of the stopper plate 15. It may be noted that the spring section 20d made of resin is not a requisite, but can be arranged if necessary.

Figure 14:
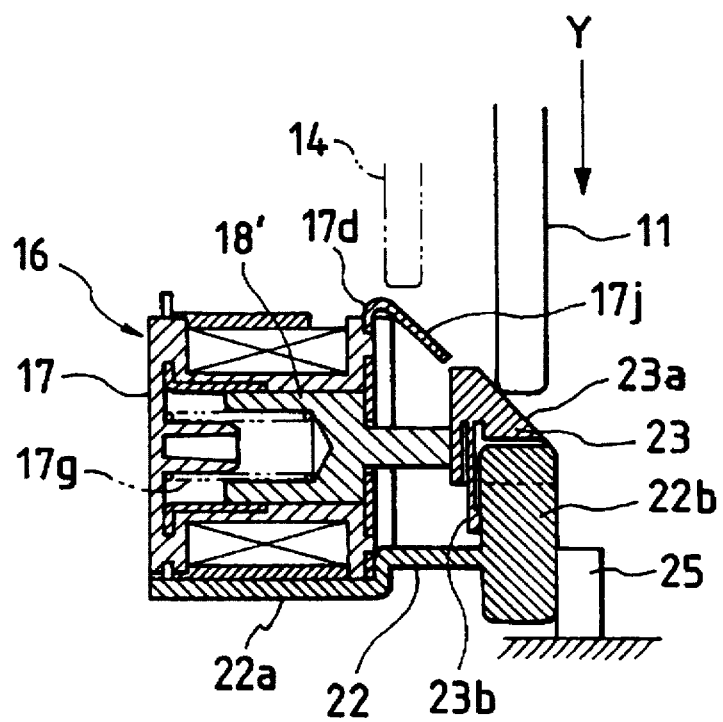
FIG. 14 is a vertically sectional view showing a main portion of a third embodiment of the invention.

FIGS. 14 and 15 show main portions of a third embodiment of the invention that provides advantages similar to those of the first embodiment. Only parts of the third embodiment distinguished from those of the first embodiment will hereunder be described.

That is, in the third embodiment, not only a stopper plate 22 is arranged as a stopper member replacing the stopper plate 15 if the first embodiment, but also a cam member 23 is arranged as an idle member replacing the cam member 20 in the first embodiment. The stopper plate 22 turns about a pivot 21 (see FIG. 15). The cam member 23 also turns about the pivot 21.

Figure 15A:
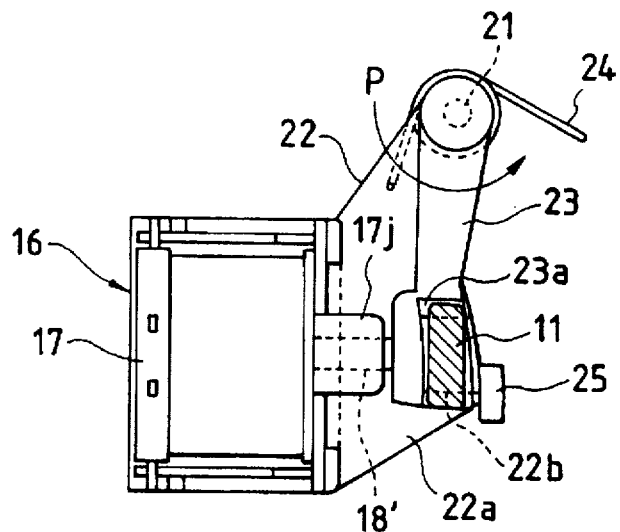
FIGS. 15(a) to (c) are plan views showing the third embodiment of the invention in different conditions.
Figure 15B:
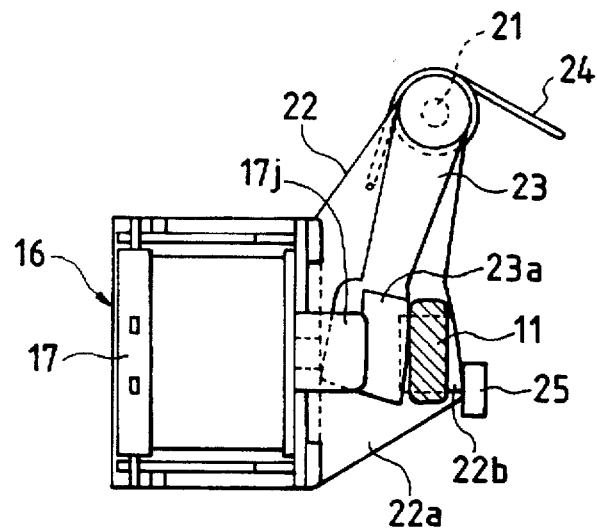
Figure 15C:
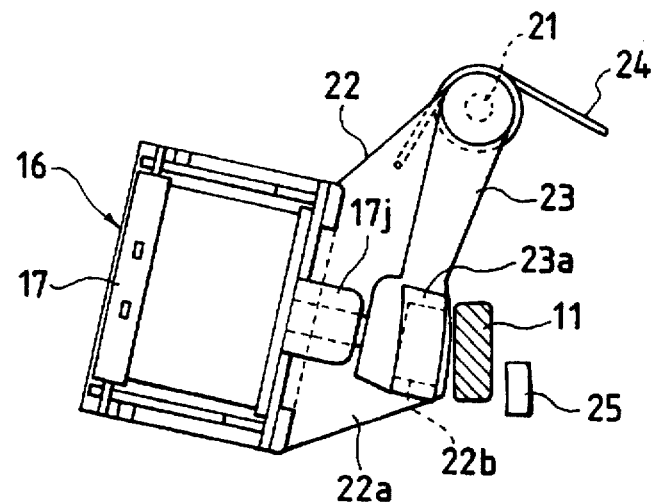
Figure 16:
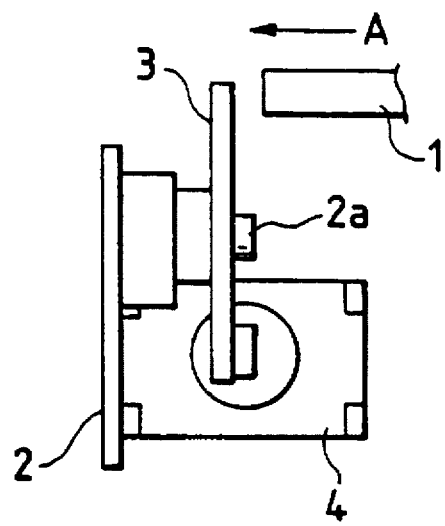
FIG. 16 is a front view showing a main portion of a conventional example.
Figure 17:
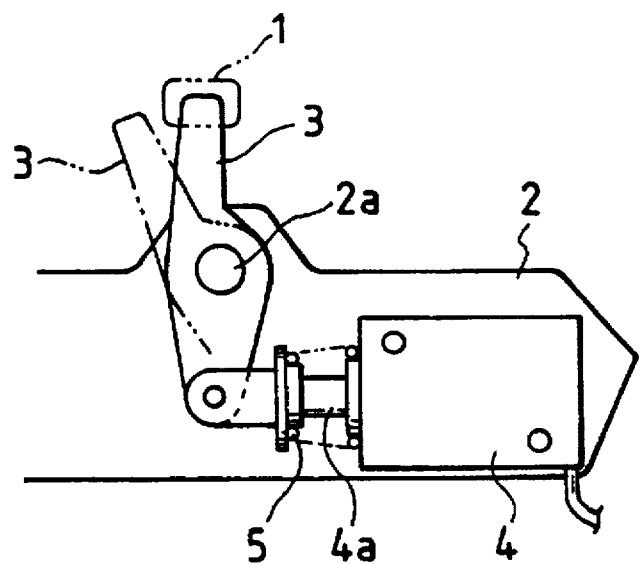
FIG. 17 is a side view of the main portion of the conventional example.

The stopper plate 22 has such a shape as to integrate a plate section 22a and a stopper section 22b. The plate section 22a allows the main body 17 of the electromagnetic solenoid 16 to be fixed thereto. The stopper section 22b is a rectangular prism rising at an end of the plate section 22a. The stopper plate 22 can reciprocate between a lock position (the position shown in FIG. 14 and FIG. 15(a), (b)) and an unlock position (the position shown in FIG. 15(c)). The lock position is a position at which the stopper section 22b is caused to confront the end of the lock plate 11 from below. The unlock position is a position at which the stopper section 22b is caused to evacuate from a locus of movement of the end of the lock plate 11. Further, as shown in FIG. 15, the stopper plate 22 is normally urged in a direction indicated by an arrow P (hereinafter referred to as the "P direction") in FIG. 15(a) by a return spring 24 constructed of a torsion coil spring, and the turning of the stopper plate 22 in the P direction is regulated by coming in contact with a wall section 25.

The cam member 23 is made, e.g., of resin and supported by the pivot 21 so as to be freely turnable. The cam member 23 is arranged with the plunger 18' of the electromagnetic solenoid 16 being brought into contact with the end of the cam member 23. The end of the cam member 23 has not only a cam surface 23a downwardly sloped in the P direction, but also a spring section 23b (see FIG. 14) made of resin and projected integrally from the lower surface of the cam member 23. By bringing the spring section 23b made of resin into pressure contact with the stopper section 22b of the stopper plate 22, the playing of the cam member 23 with respect to the plunger 18' is prevented. It may be noted that the spring section 23b made of resin is not a requisite, but can be arranged if necessary.

It may be noted that the resiliency of the return spring 24 is set to a value not only larger than the resiliency of the trip spring 17g arranged within the electromagnetic solenoid 16 along the axis of the plunger 18', but also smaller than the resultant force of the plunger 18' attracting force of the electromagnetic solenoid 16 and the resiliency of the trip spring 17g. Further, the resiliency of the spring section 23b made of resin is set to a value smaller than the resiliency of the trip spring 17g. Still further, in this case, it is preferred to use a flexible cable or the like to feed power to the electromagnetic solenoid 16.

An operation of the thus constructed embodiment is basically similar to that of the first embodiment.

That is, the stopper plate 22 is set normally in the lock position because the stopper plate 22 is urged in the P direction by the resiliency of the return spring 24 together with the main body 17 of the electromagnetic solenoid 16. Further, the cam member 23 is urged toward the lock position of the stopper plate 22 by the resiliency of the trip spring 17g together with the plunger 18' of the electromagnetic solenoid 16, so that the cam surface 23a of the cam member 23 is positioned so as to confront the lock plate 11 (see FIGS. 14 and 15(a)).

When the lock plate 11 is moved in the operating direction in response to the pressing of the detent knob (not shown) under this condition, a turning force is given to the cam member 23 in the direction opposite to the P direction by means of cam action resulting from the end of the lock plate 11 coming in contact with the cam surface 23a, and such turning force is transmitted to the plunger 18'.

If the electromagnetic solenoid 16 is energized at the time the detent knob is pressed, the plunger 18' is attracted to the yoke 17d belonging to the main body 17 of the electromagnetic solenoid 16. As a result, the movement of the plunger 18' with respect to the main body 17 is bound. In this case, the resiliency of the return spring 24 is smaller than the resultant force of the plunger 18' attracting force of the electromagnetic solenoid 16 and the resiliency of the trip spring 17g urging the plunger 18' toward the lock position. Therefore, when the moving force is transmitted to the plunger 18' in response to the pressing of the detent knob as described above, the entire part of the electromagnetic solenoid 16 and the stopper plate 22 fixed to the main body 17 of the electromagnetic solenoid 16 are moved to the unlock position running against the resiliency of the return spring 24 as shown in FIG. 15(c).

As a result, when the lock plate 11 is moved in the Y direction in response to the pressing of the detent knob, the stopper plate 22 is kept evacuated from the locus of movement of the lock plate 11 to thereby allow the lock plate 11 to move in the Y direction. Therefore, the pressing of the detent knob is made effective.

On the other hand, when the electromagnetic solenoid 16 is disenergized when the detent knob is pressed, the plunger 18' of the electromagnetic solenoid 16 becomes movable with respect to the main body 17. In this case, since the resiliency of the trip spring 17g is smaller than the resiliency of the return spring 24, it is only the cam member 23 and the plunger 18' that are moved to the unlock position running against the resiliency of the trip spring 17g when the moving force is transmitted to the plunger 18' via the cam member 23 in response to the pressing of the detent knob. The stopper plate 22 having the main body 17 fixed thereto remains held in the lock position as shown in FIG. 15(b).

As a result, when the lock plate 11 is moved in the Y direction in response to the pressing of the detent knob, the end of the lock plate 11 is brought into contact with the stopper section 22b of the stopper plate 22, prohibiting the movement of the lock plate 11. As a result, further pressing of the detent knob is made ineffective.

It may be noted that the invention is not limited to the aforementioned embodiments, but can be modified or expanded in the following ways.

In the first to third embodiments, the cam plate 17j corresponding to the cancel pin 14 may be arranged on the stopper plate 15 or 22. Further, in place of the electromagnetic solenoid 16, a combination of an electromagnet and movable members attracted selectively by the electromagnet may be employed while the guide grooves 12e for inserting the guide projections 20c of the cam member 20 thereinto are arranged in the case 12 in the first and second embodiments, the guide grooves may be formed in the stopper plate 15.

What is claimed is:

1. A lock system for motor vehicles selectively making an operation of an operating member ineffective, comprising:

an interlock member for moving in a predetermined moving direction while interlocking with the operation of the operating member;

a stopper member capable of reciprocating between a lock position and an unlock position, the lock position being a position at which movement of the interlock member is prohibited by bringing the interlock member into contact with the stopper member when the interlock member is moved in the operating direction, the unlock position being a position at which the interlock member is permitted to move by evacuating the stopper member from a locus of movement of the interlock member;

an idle member applying a moving force allowing the stopper member to move toward the unlock position in response to the movement o#the interlock member in the operating direction;

a movable member to which the moving force of the idle member is transmitted;

an electromagnet having a main body fixed to the stopper member and binding the movement of the movable member with respect to the main body while being energized;

a first spring means for urging the idle member toward the lock position of the stopper member together with the movable member; and a second spring means for urging the stopper member toward the lock position together with the main body of the electromagnet, wherein a resiliency of the second spring means is set to a value larger than a resiliency of the first spring means and smaller than a resultant force of a movable member attracting force of the electromagnet and a resiliency of the first spring means.

2. A lock system for motor vehicles according to claim 1, wherein the idle member includes a cam member being moved toward the unlock position of the stopper member by means of cam action resulting from the idle member coming in contact with the interlock member when the interlock member is moved in the operating direction.

3. A lock system for motor vehicles according to claim 1, wherein the electromagnet includes an exciting coil and yokes of an electromagnetic solenoid and the movable member includes a plunger of the electromagnetic solenoid.

4. A lock system for motor vehicles according to claim 2, wherein the electromagnet includes an exciting coil and yokes of an electromagnetic solenoid; and the movable member includes a plunger of the electromagnetic solenoid.

5. A lock system for motor vehicles according to claim 1, wherein, when the electromagnet is energized at the time of operating the operating member, the movement of said movable member with respect to the main body of electromagnet is bound.

6. A lock system for motor vehicles according to claim 1, wherein when the electromagnet is disenergized at the time the operating member is operated, the movable member is kept movable with respect to the main body of the electromagnet.

* * * * *